United States Patent [19]
Barbier

[11] 3,866,174

[45] Feb. 11, 1975

[54] METHOD OF EXPLORING A MEDIUM AND ITS APPLICATIONS IN SEISMIC EXPLORATION

[75] Inventor: Maurice Barbier, Ousse, France

[73] Assignee: Societe Nationale Des Petroles D'Aquitaine, Paris, France

[22] Filed: May 15, 1973

[21] Appl. No.: 360,435

[30] Foreign Application Priority Data
May 19, 1972 France .............................. 72.18172

[52] U.S. Cl.................340/15.5 TA, 340/155 SC, 340/155 TC, 324/77 A
[51] Int. Cl............................................. G01v 1/22
[58] Field of Search............340/15.5 TA, 15.5 SC, 340/15.5 TC, 7 R; 324/77 A

[56] References Cited
UNITED STATES PATENTS

| | | | |
|---|---|---|---|
| 3,332,511 | 7/1967 | Silverman.................... | 340/15.5 TA |
| 3,483,514 | 12/1969 | Barbier et al................ | 340/15.5 TA |
| 3,622,970 | 11/1971 | Sayous et al......................... | 340/7 R |
| 3,680,040 | 7/1972 | Silverman.................... | 340/15.5 TA |

Primary Examiner—T. H. Tubbesing
Assistant Examiner—N. Moskowitz
Attorney, Agent, or Firm—Bacon & Thomas

[57] ABSTRACT

A method of exploring a medium, in which a sequence of waves is produced in the medium in the form of long continuous oscillatory signals emitted by a number of sources, the reflected waves are received by at least one receiver, and the times taken by the waves to travel are determined by crosscorrelating the signals received and recorded with the references for the signals emitted.

This method is characterized by the fact that the interval between the times at which two sources or emitters begin to emit consecutively is less than the sum of the duration of emission by the first emitter and the time taken for the longest distance covered by the waves in the medium being explored, and that the times at which the various sources begin to emit and the polarities of their signals, are such that when the sequence of times at which emission of all sources beings, each combined to the polarities of the emitted signals, are crosscorrelated with the sequence of times at which at least an emission of one of these sources begins combined to the polarities of the signals it emits a function is obtained which presents negligible correlation residues for the length of time $\alpha$.

This method can be applied to seismic exploration in several dimensions, with a marked reduction under certain conditions in organized surface noise reaching the receivers.

8 Claims, 8 Drawing Figures

METHOD OF EXPLORING A MEDIUM AND ITS APPLICATIONS IN SEISMIC EXPLORATION

This invention concerns exploration of a medium by transmitting energy through it, and more specifically the geophysical exploration of ground by seismic waves.

The emission of energy from any point on or near the surface of the earth, the emission point, produces waves in the ground which follow various paths, and in particular are reflected back by the interfaces between geological layers of different compositions, so that these interfaces act as wave reflectors. If detectors such as seismographs are placed at suitable points, the reflected waves can be collected and recorded in the form of signals at one or more reception points. By processing these recorded signals, the interval elapsing between the times at which the energy was emitted into the ground and the arrival of the waves at the detectors, after reflection on the various reflectors, can be determined. This can then be used to deduce the depths of the corresponding reflectors, since the speed of propagation of the waves in the ground is known. Each recording sequence generally begins when emission of the waves starts, and it stops only after a period equal to the duration of emission plus an idle period corresponding to the time taken for the waves to reach and travel back from the deepest reflector between the emission and reception points.

In exploration methods using long signals, the energy producing the waves propagated in the ground is transmitted in the form of a signal which is long in duration compared with the duration of the shock that would be created if this energy were transmitted in the form of a single impulse and which is not repetitive during its emission; it consists notably of a continuous oscillating signal, the polarity of which can be chosen, and the frequency and/or amplitude of which vary in relation to time, or of a sequence of impulses, all positive, and with approximately uniform amplitude, obeying a random law of appearance. Investigation of the time taken by the waves produced by this long signal to travel consists of intercorrelating the signal or signals recorded with the reference for the long signal emitted.

If $f(t)$ and $g(t)$ represent the respective amplitudes of the signals emitted and received in relation to time, and $\alpha$ represents the interval corresponding to the longest distance covered by the waves in the ground, the function $$k(\tau) \int_0^\alpha g(t) f(t+\tau) dt$$

defines the intercorrelation function of $f(t)$ and $g(t)$ for the time interval $\alpha$.

For a given value of $\alpha$, this function $k(\tau)$ shows one or more maxima for values $\tau_1, \tau_2, \tau_3$, etc., corresponding to the time taken by the waves to travel from the emission point to the reception point, with reflection on reflectors $R_1$, $R_2$, $R_3$, etc.

Proposals have been made for an improvement in exploration methods using long signals consisting of a sequence of impulses of approximately uniform amplitude and obeying a random law of appearance, and allowing several different seismic cross-sections of the medium to be obtained during exploration with the same receiver unit and with the same duration of emission; this improvement consists of emitting the long signal from a number of sources, which begin emission in accordance with a particular time pattern.

Although useful, these methods of exploration using long signals are not fully satisfactory: in particular, they involve a drawback inherent in ground-level seismic methods, the creation, during transmission of energy into the ground, of organized surface noise, which is propagated longitudinally from the point or points of emission and is superimposed on the vertically propagated and reflected signals reaching the detector or detectors. This is particularly marked in the case of long signal methods, because of the duration of their emission into the ground, resulting in an equal duration for the accompanying surface noise.

This invention offers an improved method of exploration using long signals, in which continuous oscillatory signals emitted by a number of sources, which begin emitting at different times, are transmitted into the medium being explored; this ensures greater efficiency, particularly as regards the possibility of measuring separate seismic contours in the medium with the same receiver unit and for the same duration of emission; also, in certain circumstances, it can greatly reduce organized surface noise created during emission of the long signal into the medium.

The present invention proposes a method of exploring a medium, in which a sequence of waves is produced in the medium, in the form of long continuous oscillatory signals emitted by a number of sources, or emitters, which begin emitting at different times, these signals not being repetitive during the period of emission, the waves, after being reflected on at least one reflector, are detected and recorded, in the form of signals, by means of at least one receiver, and the times taken by the waves to travel are calculated by intercorrelating the signals received and recorded with the references of the signals emitted, characterized by the fact that the interval between the times at which two sources begin to emit consecutively is less than the sum of the duration of emission by the first source and the time corresponding to the longest distance covered by the waves in the medium being explored, and that the times at which the various sources begin to emit and the polarities of their signals, as defined by an emission pattern, are such that when the sequence of times at which emission of all sources begin, each combined to the polarities of the emitted signals are crosscorrelated or intercorrelated with the sequence of times at which at least an emission of one of these sources begins combined to the polarities of the signals, it emits, a function is obtained, throughout the time corresponding to the longest distance covered by the waves in the medium being explored, for which the ratio of the amplitude of the maximum peak to the amplitude of each of the secondary residues is greater than the ratio of the amplitudes of the long signals received, after intercorrelation with the references of the long signals emitted by each of the sources, for intervals of time corresponding to the given interval separating the maximum peak from each of the secondary residues.

The long signals used in this method of exploration must be continuous and oscillatory, and are not repetitive during the period of emission. They include vibrations for which the frequency and/or amplitude vary in relation to time, and in particular sinusoidal vibrations in which the frequency is a linear function of time. Vibrations may be produced by means of hydraulic or electromagnetic vibrators as emitters, while devices such as variable-frequency oscillators may be used to pilot these vibrators. Depending on circumstances, the various emitters can emit different signals, or ones that are identical except for polarity.

The different sources of emission, or emitters, of which there are at least two, may be on the same level, as in the case of underwater exploration in particular, or on different levels, as is generally the case for seismic exploration on land, because of the relief of the medium being explored; in this case, readings are corrected to obtain the same plane of reference.

The different emitters may be positioned in any way in relation to the receiver unit. In one embodiment of the method, they are aligned at right angles to the direction of the receiver unit, with one of the sources on the same axis as the receiver unit, and the distance between two consecutive sources preferably being equal to the distance between the receiver and the emitter on the same axis as it.

In another embodiment of the method, the emitters are aligned with the receiver unit. This embodiment produces a marked reduction in organized surface noise created by the signals before it reaches the receiver unit, when the different sources emit signals that are identical except for polarity, all the sources between the one emitting first and any given receiver emit in reverse order of their distance from the receiver, and the distances between the sources are functions of the intervals separating the times at which they begin to emit, the polarity and amplitude of the signals they emit, and the speed of propagation of organized surface noise created during emission by these sources.

In one recommended embodiment of this form of the method, any two consecutive sources emit signals with opposite polarities, and the distance between the two sources is equal to the product of the interval separating the times at which they begin to emit by the speed of propagation of the organized surface noise created during emission by the sources.

According to one particular feature of this method, any two consecutive times at which one source begins emission are separated by an interval at least equal to the sum of the duration of emission by the source and the time corresponding to the longest distance covered by the waves in the medium being explored.

Several receiver units can also be used, the waves emitted by each source and reflected on the different reflectors being recorded by each receiver unit, so that the number of seismic contours can be increased in more than one direction.

It will be easier to understand the invention from the following description of one possible embodiment, with reference to the accompanying illustrations, in which.

Figure 1:
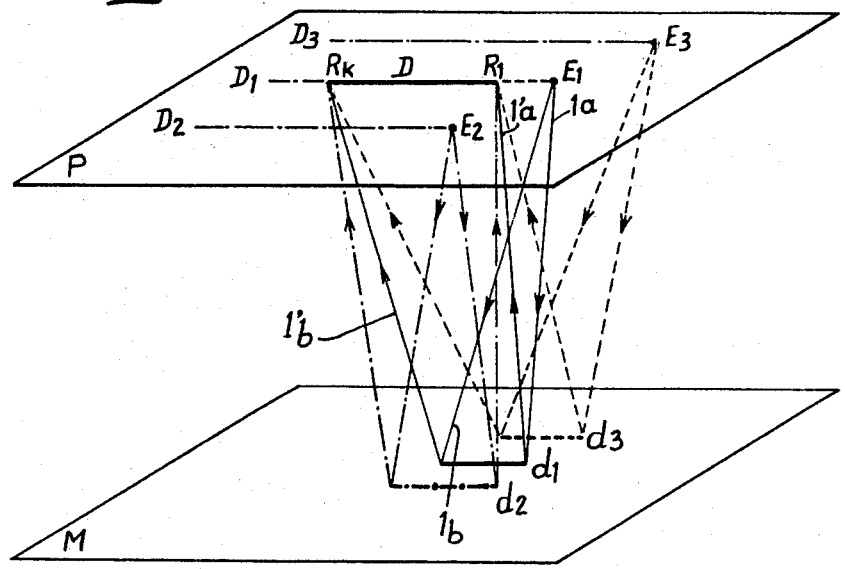
FIG. 1 represents the paths of seismic waves from three emitters moving in three directions, and detected after reflection by a single receiver unit.

In the seismic exploration installation shown in diagrammatical form in FIG. 1, the receiver unit comprises a number of detectors or seismographs, $R_1$ to $R_K$, positioned along a line D. The first emitter $E_1$ moves in a direction $D_1$ on the same alignment as D.

Emitters $E_2$ and $E_3$ are positioned on the same plane P as D and $E_1$, and they move in directions $D_2$ and $D_3$ respectively, approximately parallel to line D, and on each side of $E_1$, so that all three sources are aligned, the distance between $E_1$ and each of them being approximately the same as the distance between $E_1$ and the nearest detector $R_1$ in the receiver unit. Sources $E_1$, $E_2$ and $E_3$ may be vibrators emitting sinusoidal signals with the same amplitude, and the frequency of which is a linear function of time. The signals emitted by $E_2$ and $E_3$ are out of phase with the signal emitted by $E_1$, and the emission periods of these signals are equal, approximately 7 seconds.

The waves emitted by $E_1$ are propagated in the ground, and some of their components are reflected by a portion of reflector, represented by the segment $d_1$ of a reflecting plane M. The incident wave $1a$ corresponds to the reflected wave $1'a$ detected by $R_1$, while incident wave $1b$ corresponds to the reflected wave $1'b$ detected by Rk. The same applies to the waves emitted by $E_2$ and $E_3$ and reflected on segments $d_2$ and $d_3$ respectively. Detectors $R_1$ to $R_k$ of the receiver unit thus simultaneously record the waves emitted by sources $E_1$, $E_2$ and $E_3$ and reflected on segments $d_1$, $d_2$ and $d_3$.

Figure 2:
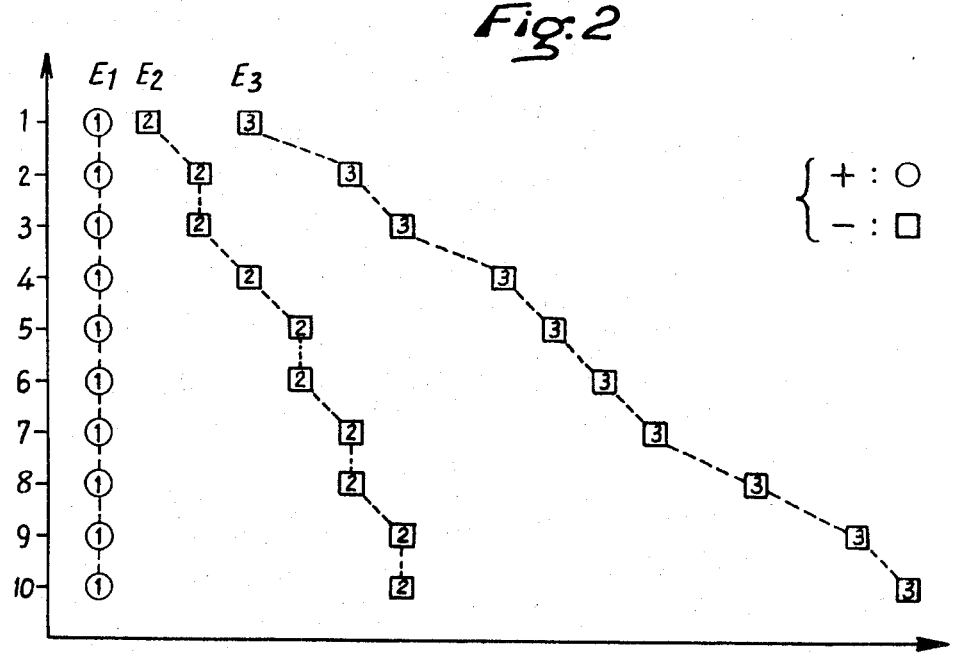
FIG. 2 shows an emission pattern for each of the three sources in relation to time, with an indication of the polarity at the times at which the three sources begin emission.
Figure 3A:
FIGS. 3a, 3b, 3c and 3d are diagrams of the times at which sources $E_1$, $E_2$, $E_3$ and all three sources begin to emit respectively.
Figure 3B:
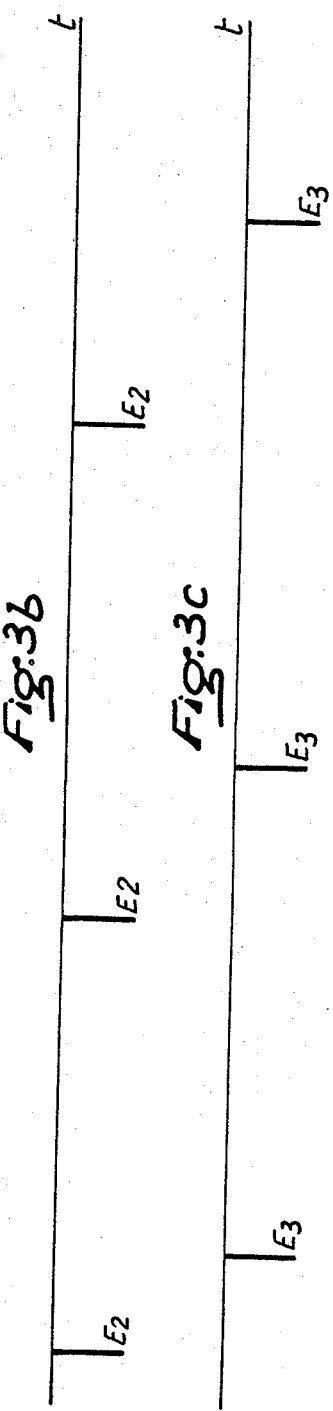
Figure 3C:
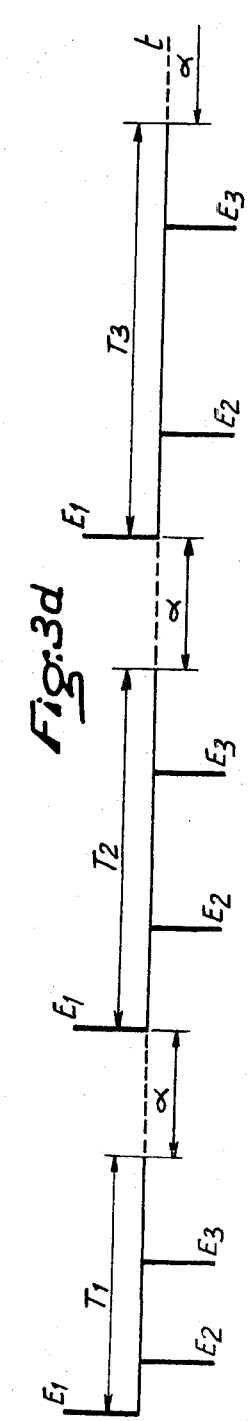
Figure 3D:
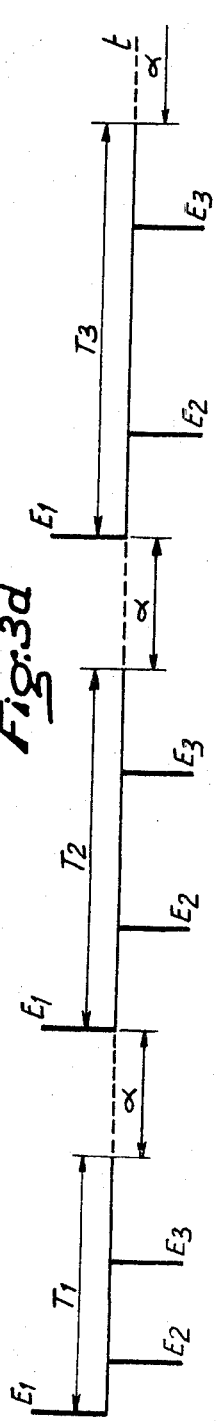

FIG. 2 shows an emission pattern for sources $E_1$, $E_2$ and $E_3$, for 10 successive recording cycles on the same scanning basis. This pattern is further defined by the table below, which gives the values $\Delta_{12}$, $\Delta_{13}$ and $\Delta_{23}$ of the intervals, in multiples of a time unit $\theta$, separating the times at which sources $E_1$ and $E_2$, $E_1$ and $E_3$, and $E_2$ and $E_3$ begin to emit respectively, opposite the number of the recording cycle.

Table

| Number of recording cycle | Δ 12 | Δ 13 | Δ 23 |
|---|---|---|---|
| 1 | θ | 3 θ | 2 θ |
| 2 | 2 θ | 5 θ | 3 θ |
| 3 | 2 θ | 6 θ | 4 θ |
| 4 | 3 θ | 8 θ | 5 θ |
| 5 | 4 θ | 9 θ | 5 θ |
| 6 | 4 θ | 10 θ | 6 θ |
| 7 | 5 θ | 11 θ | 6 θ |
| 8 | 5 θ | 13 θ | 8 θ |
| 9 | 6 θ | 15 θ | 9 θ |
| 10 | 6 θ | 16 θ | 10 θ |

The duration of recording cycle $i$ is equal to the duration T$i$ between the start of emission by source $E_1$ and the end of emission by source $E_3$, plus the time $\alpha$ corresponding to the distance covered by the longest wave propagated in the medium being explored. In seismic exploration, $\alpha$ is usually 5 to 6 seconds.

Between the end of emission by the last source $E_3$, in any one cycle in FIG. 2, and the time at which the first source $E_1$ begins to emit, in the next cycle, an interval of at least $\alpha$ seconds elapses in this example.

At point of time O, source $E_1$ begins to emit a long signal of positive polarity, the duration $\delta$ of which is approximately 7 seconds; the time at which emission begins, and the corresponding polarity, are recorded. After an interval $\Delta_{12}$, equal to $\theta$ seconds, the second source $E_2$ begins in turn to emit the same long signal, but with negative polarity; the time at which emission begins, and the corresponding polarity, are also recorded. When an interval $\Delta_{13}$, equal to $3\theta$ seconds, has elapsed from the start of emission by source $E_1$, source $E_3$ begins to emit the same long signal with negative polarity; the time at which emission begins, and the corresponding polarity, are reorded.

Recording cycle No. 1 thus lasts for a period equal to the time elapsing between the start of emission by $E_1$ and the end of emission by $E_3$, plus the time corresponding to the distance covered by the longest wave propagated in the medium being explored, namely ($T_1 + \alpha$) seconds or ($3\theta + \delta + \alpha$) seconds.

The second recording cycle begins with the start of the second emission by $E_1$, $E_2$ and $E_3$ then begin their second emissions $2\theta$ and $5\theta$ seconds respectively after the start of the second emission by $E_1$, and the second recording cycle lasts for a period equal to ($T_2 + \alpha$), or ($5\theta + \delta + \alpha$) seconds. This continues until the 10 recording cycle, which begins with the start of the 10 emission by $E_1$ and ends $\alpha$ seconds after the end of the 10 emission by $E_3$, lasting for a period equal to ($T_{10} + \alpha$) or ($16\theta + \delta + \alpha$) seconds.

The total duration $T'$ of recording is equal to $$\sum_{1}^{10} (Ti + \alpha),$$

or ($96\theta + 10\delta + 10\alpha$) seconds.

In this example, emission was continued for 10 recording cycles. Naturally, it can be stopped at the end of any one recording cycle. This does not cause any difficulty in subsequent processing of the recorded signals, since all the times at which emissions start, with the polarity of the signals emitted, are recorded on one or more reference bands.

For the example given above, FIGS. 3a, 3b, 3c and 3d show the diagrams of the times at which emissions start, with the corresponding polarities, for $E_1$, $E_2$, $E_3$ and all three sources respectively, for the first three recording cycles without any stop after each cycle.

It will be seen that sources $E_1$, $E_2$ and $E_3$ emit simultaneously, in the sense that for each recording cycle emission by any one source begins while at least one of the emissions by the other two sources has not reached the receiver unit, after being reflected on the deepest reflector. However, emissions are not synchronous, since the times at which they start are offset from one another in accordance with a predetermined pattern.

During emission, the receiver unit records simultaneously the waves produced by $E_1$, $E_2$ and $E_3$ and reflected by $d_1$, $d_2$ and $d_3$. Consequently, signals from each of these sources $E_1$, $E_2$ and $E_3$ are mixed during recording. If the functions representing the time pattern for the start of emissions by $E_1$, $E_2$ and $E_3$ are referred to as $f_1(t)$, $f_2(t)$ and $f_3(t)$ respectively, and the functions for seismic recordings, obtained when emission takes place at ground level using sources $E_1$, $E_2$ and $E_3$ separately, are referred to as $h_1(t)$, $h_2(t)$ and $h_3(t)$ respectively, what is received by the receiver is the sum of the convolution products, as follows:

$$f_1(t) * h_1(t) + f_2(t) * h_2(t) + f_3(t) * h_3(t)$$

where the sign * means "convoluted by."

Because of the particular emission pattern selected for $E_1$, $E_2$ and $E_3$, results corresponding to the reflectors $d_1$, $d_2$ and $d_3$ can be obtained from these mixed recordings, by intercorrelating the signals received and recorded by the receiver unit with the sequence of times at which $E_1$, $E_2$ and $E_3$ begin emission and the corresponding polarities.

If, for the interval of time $\alpha$, the signals received by the receiver unit or units are intercorrelated with one of the emission functions defined above, the result can be expressed, for $E_1$ for example, as follows:

$$F_{11}(t) * h_1(t) + F_{12}(t) * h_2(t) + F_{13}(t) * h_3(t)$$

where $F_{11}(t)$ is the autocorrelation function of $f_1(t)$, and $F_{12}(t)$ and $F_{13}(t)$ are the intercorrelation functions of $f_1(t)$ with $f_2(t)$, and $f_1(t)$ with $f_3(t)$, respectively.

Because of the emission pattern selected for $E_1$, $E_2$ and $E_3$, the ratio of the maximum peak of $F_{11}(t)$ to the sum of the amplitudes of the secondary residues $F_{12}(t)$ and $F_{13}(t)$ is greater than the ratio of the amplitudes of the signals received in the intervals between $F_{11}(t)$ and each of these secondary residues, so that the final result is physically identical with what would have been obtained if source $E_1$ had emitted alone, according to the pattern $f_1(t)$, in other words the product of convolution $F_{11}(t) * h_1(t)$.

By means of this intercorrelation, the required function $h_1(t)$ can thus be deduced, without interference from the secondary terms $F_{12}(t) * h_2(t) + F_{13}(t) * h_3(t)$, which can be ignored.

In the same way, to obtain a result physically the same as would be obtained if one of the other sources emitted alone, the following expression is calculated for $E_2$:

$$F_{22}(t) * h_2(t) + F_{23} * h_3(t) + F_{21}(t) * h_1(t)$$

and the following expression for $E_3$:

$$F_{33}(t) * h_3(t) + F_{31}(t) * h_1(t) + F_{32}(t) * h_2(t)$$

where $F_{22}(t)$ and $F_{33}(t)$ are the autocorrelation functions of $f_2(t)$ and $f_3(t)$ respectively, and $F_{21}(t)$, $F_{23}(t)$, $F_{31}(t)$ and $F_{32}(t)$ represent the intercorrelation functions of $f_2(t)$ with $f_1(t)$, $f_2(t)$ with $f_3(t)$, $f_3(t)$ with $f_1(t)$, and $f_3(t)$ with $f_2(t)$, which can be ignored because of the emission pattern chosen.

Figure 4:
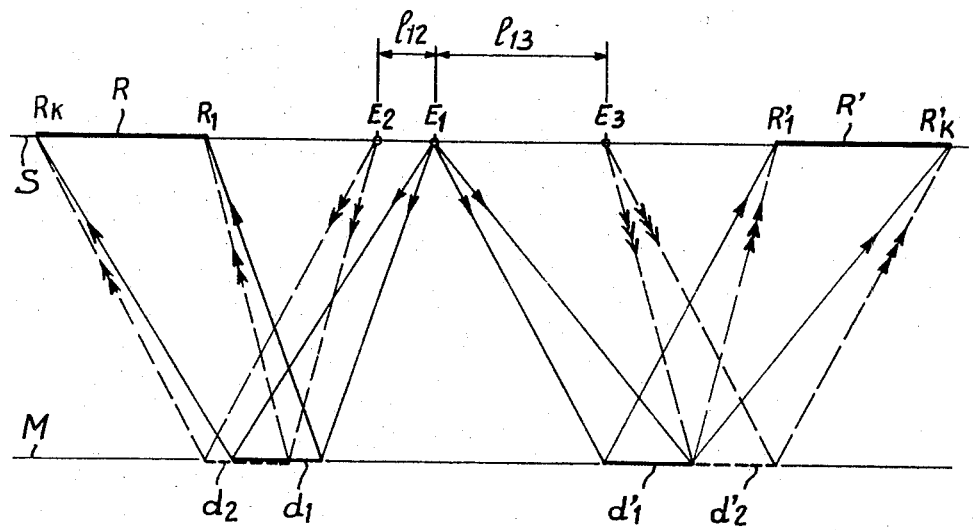
FIG. 4 illustrates how sources $E_1$, $E_2$ and $E_3$ can be used with the emission pattern shown in FIG. 2, and with two receiver units, to obtain a marked reduction in horizontal organized noise created by emissions from these sources.

In the installation shown in diagrammatical form in FIG. 4, sources $E_1$, $E_2$ and $E_3$ are aligned with the receiver units R and R', and positioned between them, with $E_2$ and $E_3$ on each side of $E_1$.

If $V$ is the velocity of horizontally propagated surface noise, the distances $(l_{12})i$ and $(l_{13})i$ are taken for the recording cycle $i$, $l_{12}$ and $l_{13}$ representing the distance from $E_1$ to $E_2$ and from $E_1$ to $E_3$ respectively, equal to $V \times (\Delta_{12})i$ for $(l_{12})i$ and $V \times (\Delta_{13})i$ for $(l_{13})i$, with source $E_1$ possibly moving between two consecutive recording cycles.

While emitting $E_1$ produces an organized surface noise with a certain polarity, which is propagated towards R and R', accompanied by the organized surface noise produced by $E_2$ and $E_3$ which has the opposite polarity to the noise from $E_1$ and which is delayed by the precise time taken for the noise from $E_1$ to reach $E_2$ and $E_3$ while moving towards R and R'. Under these conditions, the effect of the organized surface noise emitted by all three sources is greatly reduced on reaching the receivers, compared with what it would have been if all three sources had emitted synchronously and with the same polarity.

To find the vertically propagated signal, by means of which the reflections are located, the signals received and recorded during each cycle are intercorrelated with the times at which all three sources begin to emit and their corresponding polarities, and the sum of the results of intercorrelations for all recording cycles is calculated.

This result is equivalent to the result that would have been obtained if all the vibrators had emitted in phase and synchronously, convoluted by the sum of autocorrelations of the times at which the three sources begin to emit and the corresponding polarities, for each recording cycle.

Figure 5:
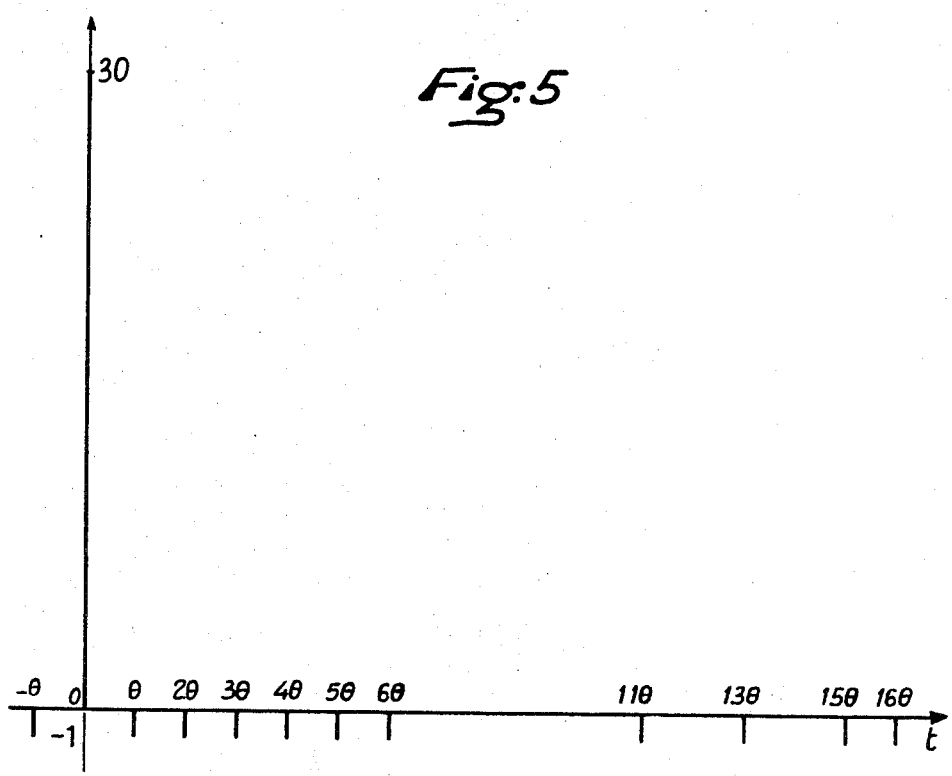
FIG. 5 shows the right-hand half of the autocorrelation function of the sequence of times at which all sources begin to emit, with the polarities of their signals; this function is symmetrical to the axis of the ordinates.

The sum of these autocorrelation functions, which depends on the pattersn for each cycle and the number of such cycles, is shown in the example illustrated in FIG. 5.

This function consists of a principal maximum of amplitude 30, since there are 10 recording cycles and three emitters, surrounded by secondary residues, the abscissae and amplitudes of which can be determined directly from the table accompanying FIG. 2.

Each value $\Delta_{12}$ or $\Delta_{13}$ on this table corresponds to an amplitude of $-1$ on the autocorrelation function, at the abscissa indicated by $\Delta_{12}$ or $\Delta_{13}$, while each value $\Delta_{23}$ on the table corresponds to an amplitude of $+1$ on the autocorrelation function at abscissa $\Delta_{23}$, the other values of the autocorrelation functions being nil.

To obtain the value of the autocorrelation function at a given point in time, for example at $4\theta$, $7\theta$ and $15\theta$, the number of times this point appears in the table is found, and the algebraic sum of the corresponding amplitudes calculated.

$4\theta$, for example, appears twice in column $\Delta_{12}$, with the value $-1$ each time, and once in column $\Delta_{23}$, with the value $+1$, giving an absolute value of $-1$ for $4\theta$ on the autocorrelation function.

$7\theta$ does not appear in any of the columns, so that the value of the autocorrelation function at this point in time is nil.

The value of the autocorrelation function at $15\theta$ is $-1$, since $15\theta$ appears only in column $\Delta_{13}$ of the table.

The use of signals with different polarities allows the same time difference between the times at which two sources begin emission to be included several times in succession, without increasing the amplitude of residues of the autocorrelation function of the times at which all the sources begin emission, and the corresponding polarities.

For a given number of recording cycles, the maximum difference that has to be used is shorter than is needed where all the signals have the same polarity, resulting in an autocorrelation function with above-zero correlation residues for a shorter length.

What is claimed is:

1. A method of exploring a medium which comprises the steps of:

transmitting into said medium a sequence of waves in the form of a long continuous signal from a plurality of spaced emission sources, at least two of said sources transmitting signals of opposite polarity, actuating said plurality of emission sources for transmission at different times, the time interval between successive emissions of any two sources being less than the sum of the duration of emission by the first of said plurality of emission sources and the time $\alpha$ corresponding to the largest distance covered by the waves in the medium explored, said times of actuating the emission sources and the polarity of the signals selected such that the crosscorrelation function over the length of time $\alpha$ of the sequence of times at which emission of all sources begin, each time being combined with the polarity of the corresponding emitted signal, with the sequence of times at which at least one source begins emitting, said times being each combined with the polarity of the corresponding emitted signal, has a ratio of the amplitude of the maximum peak to the amplitude of each of the secondary residues which is greater than the ratio of the amplitude of the long signals received after intercorrelation with a reference of the long signals emitted by each of the sources for intervals of time corresponding to the intervals separating the maximum peak from said secondary residues, receiving by means of a receiver unit and recording said long signals after reflection from reflectors in said medium, and crosscorrelating the recorded signals with a reference of the long oscillatory signal emitted by each source for determining the travel time of the reflected signals in said medium.

2. A method of exploring a medium as defined in claim 1, in which said plurality of sources emit signals that are identical except for polarity.

3. A method of exploring a medium as defined in claim 2, in which the sources are aligned with the receiver unit, so that all the sources between the one emitting first and the receiver unit emit in reverse order of their distance from the receiver, and the distances between the emitters correspond to the intervals separating the times at which they begin to emit, the polarity and amplitude of the signals they emit, and the speed of propagation of organized surface noise created during emission, whereby the organized surface noise resulting from all the emissions and reaching the receiver is considerably reduced.

4. A method of exploring a medium as defined in claim 3, in which any two consecutive sources emit signals with opposite polarities, and the distance between the two sources is equal to the product of the interval separating the times at which they begin to emit and the speed of propagation of the organized surface noise created during emission.

5. A method of exploring a medium as defined in claim 1, in which the emission sources are aligned at right angles to the direction of the receiver unit, with one of the sources on the same axis as the receiver unit, and the distance between two consecutive sources being equal to the distance between the receiver and the emitter on the same axis as it.

6. A method of exploring a medium as defined in claim 1, in which several receiver units are used, and the waves emitted by each source and reflected on the different reflectors are recorded by each receiver unit.

7. A method of exploring a medium as defined in claim 1, in which the sources emit sinusoidal signals in which at least one of the two parameters, frequency and amplitude, is a linear function of time.

8. A method of exploring a medium as defined in claim 1, in which any two consecutive times at which one source begins emission are separated by an interval at least equal to the sum of the duration of emission by the source and the time corresponding to the longest distance covered by the waves in the medium being explored.

* * * * *

UNITED STATES PATENT OFFICE
CERTIFICATE OF CORRECTION

Patent No. 3,866,174  Dated February 11, 1975

Inventor(s) Maurice Barbier

It is certified that error appears in the above-identified patent and that said Letters Patent are hereby corrected as shown below:

IN THE ABSTRACT

Paragraph 2, line 13, "time taken" should read --time $\alpha$ taken--.

IN THE SPECIFICATION:

Column 1, line 52, correct the formula to read
$$k(\tau) = \int_0^\alpha g(t) \, f(t+\tau) \, dt$$

Column 5, line 23, correct "$E_1$, $E_2$" to read --$E_1 \cdot E_2$--.

Column 7, line 22, correct the spelling of "patterns".

Signed and sealed this 15th day of July 1975.

(SEAL)
Attest:

RUTH C. MASON
Attesting Officer

C. MARSHALL DANN
Commissioner of Patents
and Trademarks